United States Patent
Adachi et al.

(10) Patent No.: US 9,502,153 B2
(45) Date of Patent: Nov. 22, 2016

(54) WIRE HARNESS WITH COAXIAL COMPOSITE CONDUCTIVE PATH

(71) Applicant: YAZAKI CORPORATION, Tokyo (JP)

(72) Inventors: Hideomi Adachi, Makinohara (JP); Yoshiaki Ozaki, Kosai (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/589,271

(22) Filed: Jan. 5, 2015

(65) Prior Publication Data

US 2015/0107871 A1  Apr. 23, 2015

Related U.S. Application Data

(63) Continuation of application No. PCT/JP2013/069676, filed on Jul. 19, 2013.

(30) Foreign Application Priority Data

Jul. 19, 2012  (JP) .................. 2012-160648

(51) Int. Cl.
*H01B 7/00* (2006.01)
*H02G 3/04* (2006.01)
*B60R 16/02* (2006.01)
*H01B 9/04* (2006.01)

(52) U.S. Cl.
CPC ......... *H01B 7/0081* (2013.01); *B60R 16/0215* (2013.01); *H01B 7/0045* (2013.01); *H02G 3/0487* (2013.01); *H01B 9/04* (2013.01); *H02G 3/0481* (2013.01)

(58) Field of Classification Search
USPC ............................. 174/84 R, 72 A
See application file for complete search history.

(56) References Cited

U.S. PATENT DOCUMENTS

| | | | | |
|---|---|---|---|---|
| 6,136,915 A | * | 10/2000 | Ohara | C08L 77/00 524/538 |
| 6,262,375 B1 | * | 7/2001 | Engelhardt | H01B 12/02 174/125.1 |
| 6,288,337 B1 | * | 9/2001 | Sato | H01B 7/0045 174/113 R |
| 7,497,284 B2 | * | 3/2009 | Yamaguchi | B60R 16/0215 174/135 |
| 8,410,789 B2 | * | 4/2013 | Koelblin | H01B 9/027 174/107 |
| 8,532,453 B2 | * | 9/2013 | Sorimachi | H01B 7/041 174/68.1 |
| 2004/0099427 A1 | | 5/2004 | Kihira | |

(Continued)

FOREIGN PATENT DOCUMENTS

| | | |
|---|---|---|
| CN | 102055122 A | 5/2011 |
| EP | 2338741 A2 | 6/2011 |

(Continued)

OTHER PUBLICATIONS

Communication issued on Jan. 20, 2015 by the International Searching Authority in related application No. PCT/JP2013/069676.

(Continued)

*Primary Examiner* — Michael F McAllister
(74) *Attorney, Agent, or Firm* — Sughrue Mion, PLLC

(57) ABSTRACT

A wire harness includes a metal pipe; a high-voltage conductive path; and another conductive path. Another conductive path is configured as an unshielded electric wire. The high-voltage conductive path includes a high-voltage circuit; a shielding member; and an insulating member.

3 Claims, 7 Drawing Sheets

(56) References Cited

U.S. PATENT DOCUMENTS

| | | | | |
|---|---|---|---|---|
| 2005/0011687 A1* | 1/2005 | Yamaguchi | ............. | B60K 6/48 180/65.1 |
| 2010/0231228 A1* | 9/2010 | Koelblin | ................ | H01B 9/027 324/544 |
| 2011/0094796 A1* | 4/2011 | Toyama | ............. | B60R 16/0207 174/72 A |
| 2012/0305308 A1 | 12/2012 | Toyama et al. | | |
| 2013/0248246 A1 | 9/2013 | Oga | | |

FOREIGN PATENT DOCUMENTS

| | | | |
|---|---|---|---|
| EP | 2533252 A1 | 12/2012 | |
| EP | 2884501 A1 | 6/2015 | |
| JP | 2006-310474 A | 11/2006 | |
| JP | 2011-165354 A | 8/2011 | |
| JP | 2012-134367 A | 7/2012 | |
| JP | 2013-042648 A | 2/2013 | |
| WO | 2011/096426 A1 | 8/2011 | |
| WO | 2012/077826 A1 | 6/2012 | |
| WO | 2012/091171 A1 | 7/2012 | |
| WO | 2013/012077 A1 | 1/2013 | |

OTHER PUBLICATIONS

International Search Report for PCT/JP2013/069676 dated Sep. 24, 2013 [PCT/ISA/210].
Written Opinion for PCT/JP2013/069676 dated Sep. 24, 2013 [PCT/ISA/237].
Communication issued on Feb. 23, 2016 by the European Patent Office in related Application No. 13819608.4.
Communication dated Dec. 24, 2015 issued by The State Intellectual Property Office of the People's Republic of China in counterpart Chinese Patent Application No. 201380038487.6.
Communication dated May 31, 2016 issued by the Japanese Patent Office in counterpart Japanese Patent Application No. 2012-160648.
Chinese Office Action dated May 27, 2016 issued by the State Intellectual Property Office of P.R. China in corresponding Application No. 201380038487.6.

* cited by examiner

WIRE HARNESS WITH COAXIAL COMPOSITE CONDUCTIVE PATH

CROSS REFERENCE TO RELATED APPLICATIONS

This application is a continuation of PCT application No. PCT/JP2013/069676, which was filed on Jul. 19, 2013 based on Japanese Patent Application (No. 2012-160648) filed on Jul. 19, 2012, the contents of which are incorporated herein by reference.

BACKGROUND OF THE INVENTION

1. Field of the Invention

One or more embodiments of the present invention relate to a wire harness that uses a metal pipe as an exterior member.

2. Description of the Related Art

Generally, a battery and an inverter unit in a hybrid vehicle or an electric vehicle are electrically connected to each other via a high-voltage (namely, for high-voltage) wire harness. The wire harness includes a conductive path and an exterior member that accommodates the conductive path.

In JP-A-2006-310474, a conductive metal pipe is used as the exterior member. The metal pipe is also used as a shielding member for shielding the conductive path from electromagnetic waves. Two types of conductive paths, that is, a plurality of first conductive paths and a plurality of second conductive paths are inserted into the metal pipe. The respective circuit end portions of the plurality of first conductive paths and the respective circuit end portions of the plurality of second conductive paths lead out of an end of the metal pipe. The plurality of first conductive paths are thick high-voltage electric wires. In contrast, the plurality of second conductive paths are electric wires, each of which is thinner than the first conductive path.

The respective circuit end portions of the plurality of first conductive paths leading out of the end of the metal pipe are shielded with a first cylindrical flexible shielding member. An end of the first flexible shielding member is fixed to the end of the metal pipe.

An opening portion of a predetermined size is formed in an outer circumferential surface of the first flexible shielding member. The respective circuit end portions of the plurality of second conductive paths leading out of the end of the metal pipe lead out of the opening portion. The respective circuit end portions of the plurality of second conductive paths in the vicinity of the end of the metal pipe are shielded with the first flexible shielding member. In contrast, portions of the respective circuit end portions of the plurality of second conductive paths, which lead from the opening portion to the outside, are shielded with a cylindrical second flexible shielding member that is formed to the size of the opening portion.

A shielding treatment using the metal pipe as a shielding member, the first flexible shielding member, and the second flexible shielding member is a treatment by which noise (electromagnetic waves) originating from the plurality of first conductive paths and the plurality of second conductive paths is prevented from leaking out of the wire harness.

Citation List

SUMMARY OF THE INVENTION

In the related art, since the structure for the shielding treatment using the first and second flexible shielding members is complicated, the shielding treatment takes man-hours. The use of the metal pipe as a shielding member is one of the causes of complicating the structure for the shielding treatment.

In the related art, since the structure becomes more complicated as the number of types of or the number of lead-out directions of conductive paths increases, work for the shielding treatment becomes more complicated. When the structure becomes complicated, flexibility in designing a circuit decreases.

In the related art, for example, when the first conductive path is high-voltage electric wires and the second conductive path is low-voltage electric wires, the low-voltage electric wires are directly affected by noise originating from the high-voltage electric wires.

The present invention is made in light of the problems, and an object of the present invention is to provide a wire harness in which it is possible to achieve the simplification of work, a reduction in man-hours, and an improvement in flexibility in designing a circuit, and it is possible to reduce the influence of noise on another conductive path which is assembled into the wire harness together with a high-voltage conductive path.

A wire harness according to the present invention to achieve the object has the following characteristics (1) and (2).

(1) A wire harness includes a metal pipe; and a high-voltage conductive path and another conductive path, each of which is inserted into the metal pipe and leads out of an end of the metal pipe. The another conductive path is configured as an unshielded electric wire. The high-voltage conductive path includes a first conductive path that is positioned at the center of the high-voltage conductive path and has a circular cross section; a first insulator of a predetermined thickness which covers an outer circumference of the first conductive path; a second conductive path that is provided on an outer side of the first insulator; a second insulator of a predetermined thickness which covers an outer circumference of the second conductive path; a shielding member that adheres to an outer surface of the second insulator; and an insulating member that is provided on an outer side of the shielding member.

(2) In the wire harness of (1), the another conductive path includes a low-voltage circuit that has a low voltage compared to the high-voltage conductive path.

(3) In the wire harness of (1), the first conductive path and the first insulator are a high-voltage circuit, and the second conductive path and the second insulator are a high-voltage circuit.

In the wire harness of (1), since the high-voltage conductive path has the shielding member, the high-voltage conductive path alone can prevent noise from leaking to the outside without the aid of the metal pipe. It is possible to reduce the influence of noise on the another conductive path that is assembled into the wire harness together with the high-voltage conductive path. For this reason, the another conductive path being an unshielded electric wire can be assembled into the wire harness together with the high-voltage conductive path. In the wire harness of (1), since the metal pipe is not used as the shielding member, it is possible to make a structure relevant to a shielding treatment simpler than that in the related art. Since the structure becomes simplified, it is possible to reduce the number of man-hours required for the shielding treatment. Further, since the structure becomes simplified, it is possible to improve flexibility in designing a circuit. As such, in the wire harness of (1), it is possible to achieve the simplification of work, a reduction in man-hours, and an improvement in flexibility in designing a circuit. It is possible to reduce the influence of noise on the another conductive path that is assembled into the wire harness together with the high-voltage conductive path.

In the wire harness of (2), an unshielded electric wire including the low-voltage circuit can be assembled into the wire harness together with the high-voltage conductive path. In the wire harness of (2), it is possible to provide a wire harness in which the high-voltage conductive path and the low-voltage unshielded electric wire are mixed together.

BRIEF DESCRIPTION OF THE DRAWINGS

FIG. 4A illustrates the metal pipe, FIG. 4B illustrates a high-voltage conductive path, and FIG. 4C illustrates a low-voltage conductive path.

FIG. 7A is a view illustrating a modification example of the configuration of the wire harness of FIG. 2, and FIG. 7B is a view illustrating another modification example of the configuration of the wire harness of FIG. 6.

DETAILED DESCRIPTION OF THE EXEMPLARY EMBODIMENTS

Each wire harness of embodiments includes a metal pipe, a high-voltage conductive path, and another conductive path. In the wire harness of the embodiments, the metal pipe is used as an exterior member without a shielding function. The high-voltage conductive path and another conductive path are inserted into the metal pipe. The high-voltage conductive path includes a shielding member, and another conductive path is configured as unshielded electric wires. The high-voltage conductive path leads out of an end of the metal pipe, while a circuit end portion of a high-voltage circuit is covered with a shielding end portion of the shielding member. In contrast, another conductive path leads out of the end of the metal pipe while being separate bodies with respect to the high-voltage conductive path (that is, separated from the high-voltage conductive path). The term "high-voltage" implies being for a high voltage. The term "low-voltage" (to be described later) implies being for a low voltage.

First Embodiment

Figure 1:
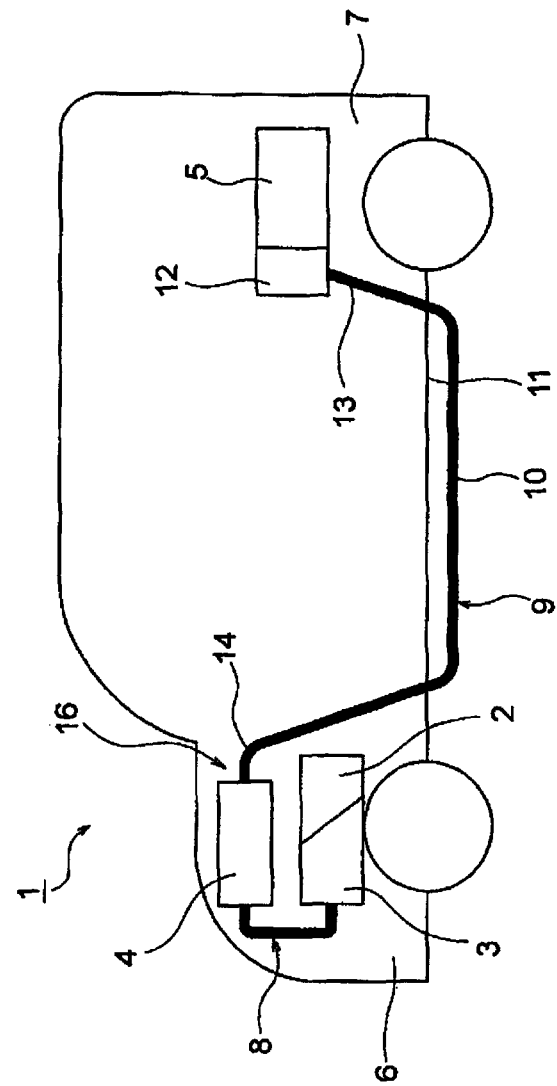
FIG. 1 is a schematic view illustrating an arranged state of a wire harness.
Figure 2:
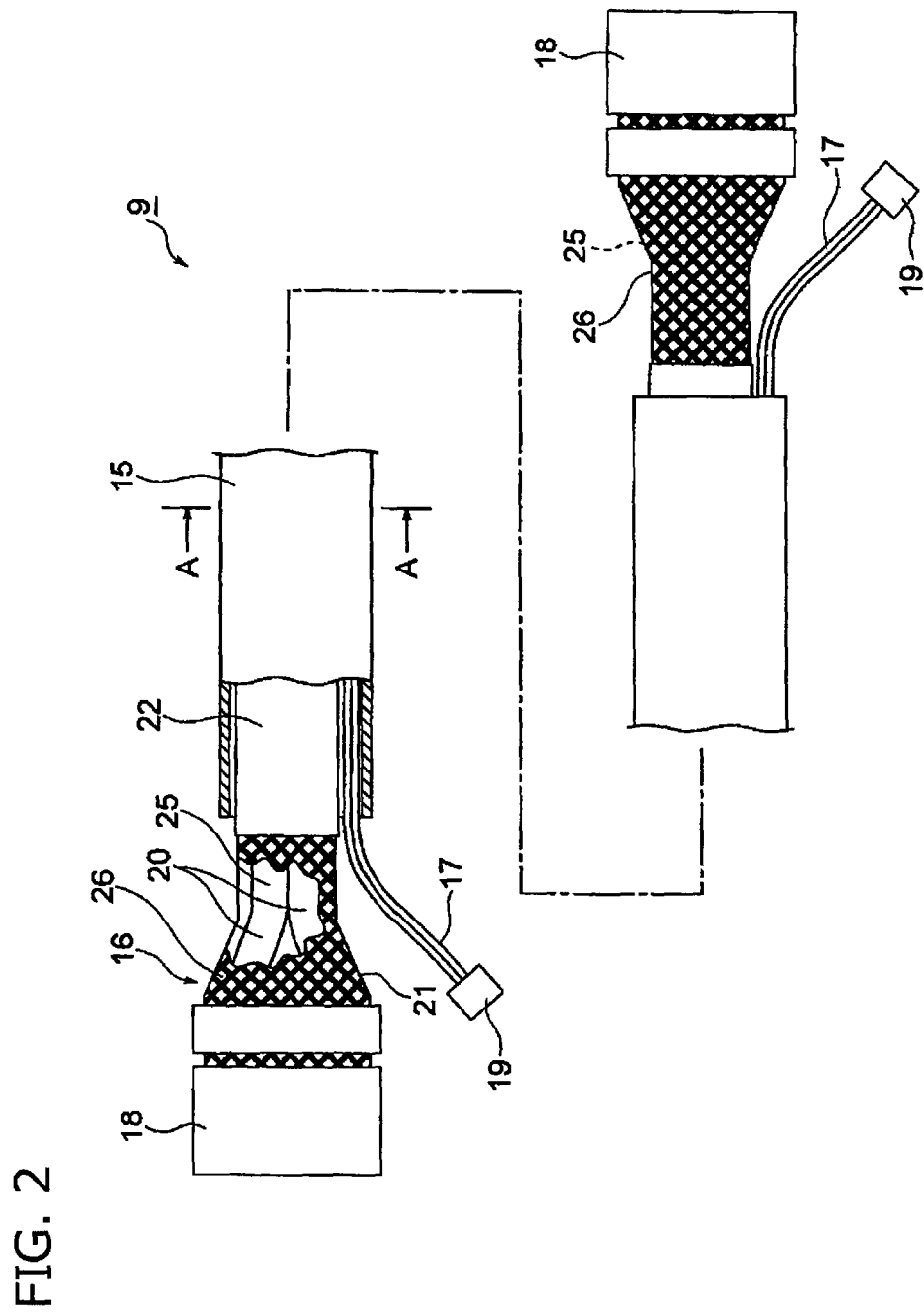
FIG. 2 is a view illustrating the configuration of the wire harness.
Figure 3A:
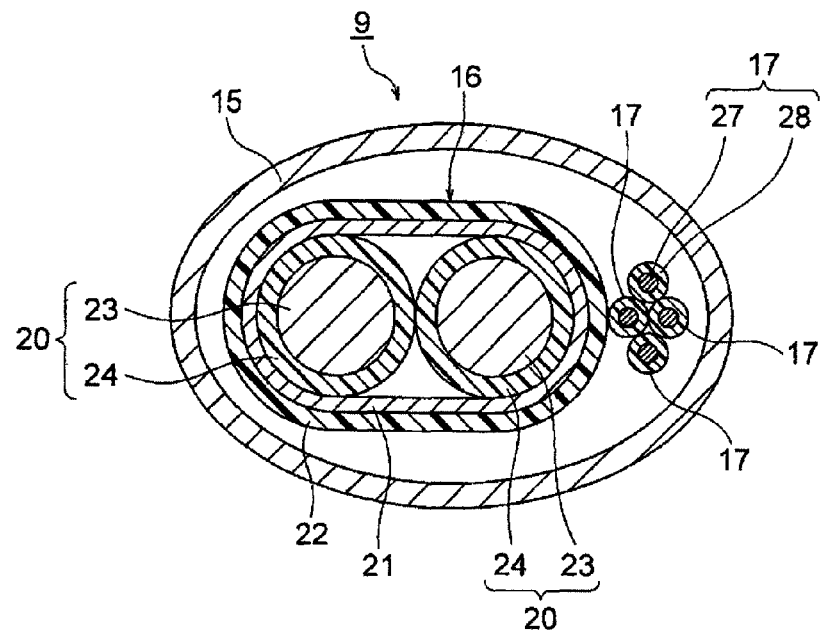
FIG. 3A is a cross-sectional view taken along line A-A in FIG. 2.
Figure 3B:
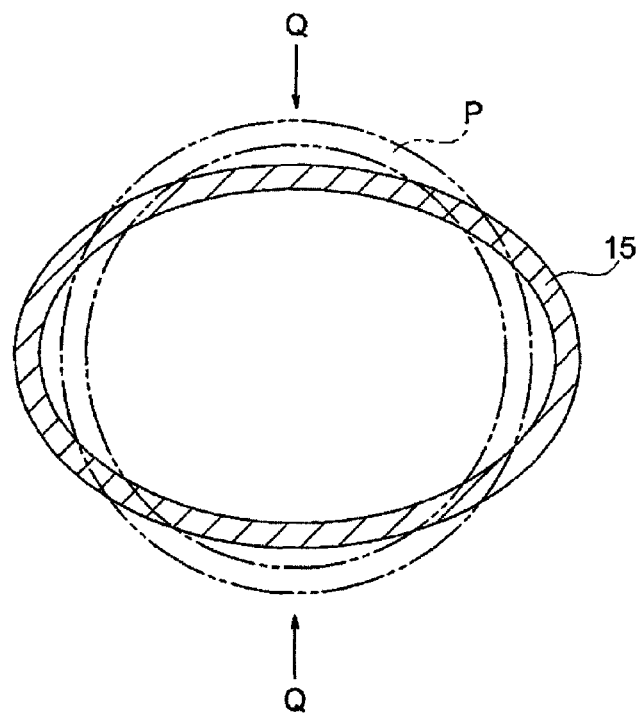
FIG. 3B is a view illustrating a process of manufacturing a metal pipe.
Figure 4A:
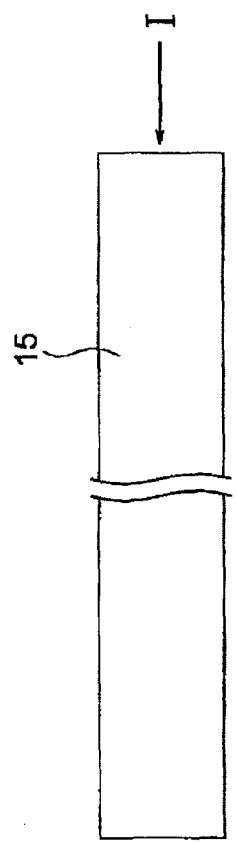
FIGS. 4A to 4C show explanatory views of a process of manufacturing the wire harness.
Figure 4B:
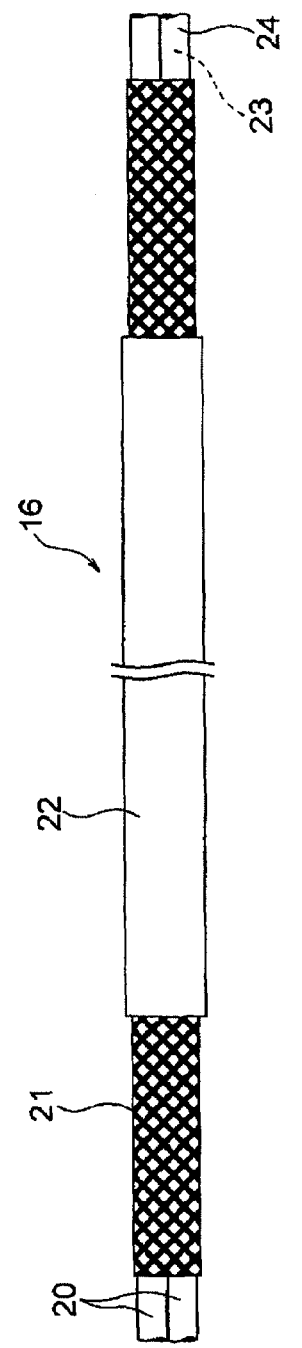
Figure 4C:
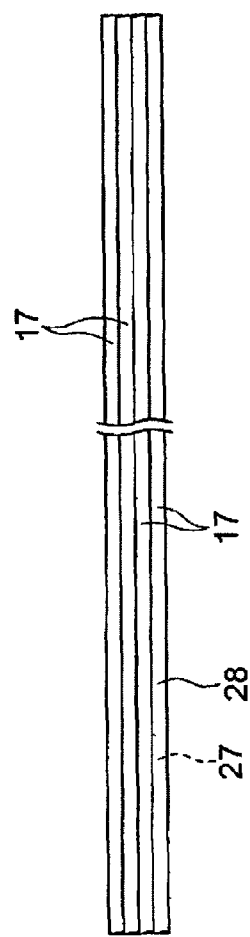

A wire harness according to a first embodiment of the present invention will be described with reference to FIGS. 1 to 4. FIG. 1 is a schematic view illustrating an arranged state of the wire harness according to the present invention. FIG. 2 is a view illustrating the configuration of the wire harness, FIG. 3A is a cross-sectional view taken along line A-A in FIG. 2, and FIG. 3B is a view illustrating a process of manufacturing the metal pipe. FIGS. 4A to 4C are views illustrating a process of manufacturing the wire harness.

In the following example, the present invention is applied to a wire harness arranged in a hybrid vehicle (may be an electric vehicle or a typical vehicle).

In FIG. 1, a reference sign 1 indicates a hybrid vehicle. The hybrid vehicle 1 is driven by a combination of two power from an engine 2 and a motor unit 3, and power is supplied to the motor unit 3 from a battery 5 (in other words, battery pack) via an inverter unit 4. In this example, the engine 2, the motor unit 3, and the inverter unit 4 are mounted in an engine compartment 6 that is positioned close to the front wheels and the like. The battery 5 is mounted in a vehicle rear portion 7 that is close to the rear wheels and the like. The battery 5 may be mounted in the interior of the vehicle, which is positioned rearward of the engine compartment 6.

The motor unit 3 and the inverter unit 4 are electrically connected to each other via a high-voltage wire harness 8. The battery 5 and the inverter unit 4 are also electrically connected to each other via a high-voltage wire harness 9. A middle portion 10 of the wire harness 9 is arranged on a vehicle floor 11. The wire harness 9 is arranged along the vehicle floor 11 while being substantially parallel with the vehicle floor 11. The vehicle floor 11 is a known body, and is a so-called panel member, and a through hole (not illustrated) is formed in the vehicle floor 11 at a predetermined position. The wire harness 9 is inserted into the through hole.

The wire harness 9 and the battery 5 are electrically connected to each other via a junction block 12 provided in the battery 5. A rear end 13 of the wire harness 9 is electrically connected to the junction block 12 by a known method. A front end 14 of the wire harness 9 is electrically connected to the inverter unit 4 by a known method.

The motor unit 3 has a motor (not illustrated) and a generator (not illustrated). The inverter unit 4 has an inverter (not illustrated) and a converter (not illustrated). The motor unit 3 is formed as a motor assembly that includes a shielding case (not illustrated). The inverter unit 4 is also formed as an inverter assembly that includes a shielding case (not illustrated). The battery 5 is a Ni-MH battery or a Li-ion battery, and is formed into a module. In addition, it is also possible to use a power storage device such as a capacitor. The battery 5 is not particularly limited to a specific form of battery insofar as the battery 5 can be used in the hybrid vehicle 1 or an electric vehicle.

First, the configuration and structure of the wire harness 9 will be described.

In FIG. 2, the wire harness 9 includes a metal pipe 15 used as an exterior member. The wire harness 9 further includes a high-voltage conductive path 16 that is inserted into the metal pipe 15, and low-voltage conductive paths 17 (that is, another conductive path) that are similarly inserted into the metal pipe 15, and are lined with the high-voltage conductive path 16. The wire harness 9 includes a high-voltage-side connecting portion 18 that is provided at an end of the high-voltage conductive path 16, and a low-voltage-side connecting portion 19 that is provided at ends of the low-voltage conductive paths 17. The wire harness 9 is attached to the vehicle floor 11 (refer to FIG. 1) using clamps (not illustrated).

In FIG. 2 to FIG. 3B, the metal pipe 15 is a tubular metal body that covers and protects the high-voltage conductive path 16 and the low-voltage conductive paths 17. In the first embodiment, the metal pipe 15 has an elliptical cross section. As illustrated in FIG. 3B, for example, the metal pipe 15 is made to have an elliptical cross section by squeezing a standard pipe (commercial product) P having a circular cross section from the direction of arrow Q. An elliptical cross section is an example of the cross section of the pipe, and the metal pipe 15 having a circular cross section may be used as it is without being squeezed. The metal pipe 15 may have an oblong circular cross section or a rectangular cross section.

With regard to the cross-sectional shape, the height dimension of the metal pipe 15 having an elliptical cross section or an oblong circular cross section can be reduced to less than that of the metal pipe 15 having a circular cross section. Accordingly, since it is possible to achieve flattening of the metal pipe 15, the elliptical cross section or the oblong circular cross section is effective in arranging the wire harness 9 on the vehicle floor 11 (refer to FIG. 1).

The metal pipe 15 has a length according to the arranging path of the wire harness 9. The metal pipe 15 has a thickness necessary for protecting the high-voltage conductive path 16 and the low-voltage conductive paths 17. In addition, the metal pipe 15 has a diameter necessary for allowing the insertion of and accommodating of the high-voltage conductive path 16 and the low-voltage conductive paths 17.

The reduction of the diameter of the metal pipe 15 is effective in achieving flattening of the pipe. The metal pipe 15 has a function of absorbing heat and radiating heat through the outer surface of the metal pipe 15 with the inner surface thereof being in contact with the high-voltage conductive path 16.

Since the metal pipe 15 accommodates the high-voltage conductive path 16, a portion of the outer surface of the metal pipe 15 is used to notify that the metal pipe 15 is for high-voltage electricity. In the embodiment, an orange-colored paint indicative of high voltage is applied to the outer surface of the metal pipe 15.

An example of a material of the metal pipe 15 is stainless steel from the viewpoint of protection performance or weather resistance. An example of a material of the metal pipe 15 may also be aluminum or an aluminum alloy from the viewpoint of protection performance or weight reduction. In the first embodiment, a metal pipe 15 made of aluminum is adopted. It is not necessary for the metal pipe 15 to have shielding properties. In the first embodiment, this is because it is not necessary to use the metal pipe 15 as a shielding member, which will be described later.

A component installed afterwards (not specifically illustrated) is attached to the outer surface of the metal pipe 15. The component installed afterwards may be a clamp for attaching the wire harness 9 to the vehicle floor 11 (refer to FIG. 1), or a grommet that is water tightly attached to the through hole formed in the vehicle floor 11.

The high-voltage conductive path 16 includes two high-voltage circuits 20; a shielding member 21 that covers the two high-voltage circuits 20; and a sheath 22 (that is, insulating member) that is provided on an outer side of the shielding member 21. This configuration is an example, and the configuration and structure of a second embodiment and a third embodiment may be adopted, which will be described later.

In the first embodiment, the high-voltage circuit 20 is a known high-voltage electric wire. The high-voltage circuit 20 has a conductor 23, and an insulator 24 that covers the conductor 23. The high-voltage circuit 20 has a length necessary for electrical connection. Since the wire harness 9 is used to electrically connect the inverter unit 4 and the battery 5 (in other words, the junction block 12), the high-voltage circuit 20 has a long length.

The conductor 23 is made of copper or a copper alloy, or aluminum or an aluminum alloy, or clad of the foregoing. A conductor structure obtained by twisting together element wires can be adopted as the structure of the conductor 23. A bar-shaped conductor structure (for example, conductor structure having a straight angle single core or a round single core, and at this time, the electric wire also has a bar shape) having a rectangular cross section or a round cross section can be adopted as the structure of the conductor 23. The insulator 24 made of an insulating resin material is extrusion-molded on the outer surface of the conductor 23.

In the embodiment, known high-voltage electric wires are adopted as the high-voltage circuit 20, but, the high-voltage circuit 20 is not limited to that in the embodiment. For example, a high-voltage circuit or the like may be adopted, which is obtained by providing an insulator on a known bus bar.

The shielding member 21 is an electromagnetic member (that is, a shielding member for acting as a countermeasure for electromagnetic waves) that covers both of the two high-voltage circuits 20 at once. A known cylindrical braid obtained by knitting a plurality of element wires together is adopted as the material of the shielding member 21. The shielding member 21 has substantially the same length as the entire length of each of the two high-voltage circuits 20. An end portion of the shielding member 21 is electrically connected to a shielded case (not illustrated) of the inverter unit 4 and the like via the high-voltage-side connecting portion 18.

A metal foil having conductivity or a member containing the metal foil may be adopted as the material of the shielding member 21 insofar as the material is capable of electromagnetic wave shielding.

A predetermined thickness of the sheath 22 is formed by extrusion molding a resin material having insulation properties on an outer side of the shielding member 21. The sheath 22 is disposed at the outermost layer of the high-voltage conductive path 16. When the wire harness 9 is manufactured, an end of the sheath 22 is processed in such a manner that a predetermined length of the shielding member 21 is exposed at the end portion of the wire harness 9. That is, after the end of the sheath 22 is processed, the wire harness 9 has a length slightly greater than that of the metal pipe 15.

The high-voltage-side connecting portion 18 is a portion that is provided for electrical connection at the end of the high-voltage conductive path 16. The high-voltage-side connecting portion 18 includes a known shielding connector and the like. The configuration and structure of the high-voltage-side connecting portion 18 are not limited to specific ones insofar as the high-voltage conductive path 16 can be electrically connected to the inverter unit 4 and the like via the high-voltage-side connecting portion 18. In addition to the shielding connector, for example, the high-voltage-side connecting portion 18 may be configured to include a conductive shielding shell and a caulking ring for connecting the end portion of the shielding member 21, and a metal fitting that is provided at the ends of the two high-voltage circuits 20 passing through the shielding shell.

The low-voltage conductive path 17 is a known low-voltage electric wire that includes a conductor 27 and an insulator 28. In the first embodiment, the low-voltage conductive path 17 is used as a signal wire. The low-voltage conductive path 17 is configured as a non-shielding electric wire. The low-voltage-side connecting portion 19 which is a known connector is provided at the ends of the low-voltage conductive paths 17. The low-voltage-side connecting portion 19 has a housing having insulation properties, and a terminal metal fitting (not illustrated) that is accommodated and fixed in a terminal accommodating compartment of the housing. The terminal metal fitting is electrically connected to the low-voltage conductive paths 17 by crimping or press-contacting the terminal metal fitting.

Subsequently, a method of manufacturing the wire harness 9 will be described based on the above-mentioned configuration and structure.

When the wire harness 9 is manufactured, as illustrated in FIG. 4A to FIG. 4C, each of the metal pipe 15, the high-voltage conductive path 16, and the low-voltage conductive paths 17 is pre-manufactured so as to have a predetermined length in a straight state. As illustrated by arrow I in FIG. 4A, a step of inserting the high-voltage conductive path 16 and the low-voltage conductive paths 17 into the metal pipe 15 individually or all at once is performed (refer to FIG. 3 for an inserted state). As illustrated in FIG. 2, a step is performed in which the high-voltage-side connecting portion 18 is provided at the end of the high-voltage conductive path 16, and the low-voltage-side connecting portion 19 is provided at the ends of the low-voltage conductive paths 17. As such, the manufacturing of the wire harness 9 is completed.

The circuit end portion 25 of the two high-voltage circuits 20 leads out of the end of the metal pipe 15 while being covered with the shielding end portion 26 of the shielding member 21. The low-voltage conductive paths also lead out of the end of the metal pipe 15 while being separate bodies with respect to the high-voltage conductive path 16 (that is, separated from the high-voltage conductive path 16).

In the wire harness 9, as described above with reference to FIG. 1 to FIG. 4C, since it is not necessary to use the metal pipe 15 as a shielding member as in the related art, it is possible to simplify the structure relevant to a shielding treatment. Accordingly, it is possible to achieve the simplification of work, a reduction in man-hours, and an improvement in flexibility in designing a circuit.

Since the high-voltage conductive path 16 has the shielding member 21, the high-voltage conductive path 16 alone can prevent noise from leaking to the outside, and the wire harness 9 from receiving outside influences without the aid of the metal pipe 15. Accordingly, it is possible to reduce the influence of noise on the low-voltage conductive paths 17 that are assembled into the wire harness 9 together with the high-voltage conductive path 16. For this reason, it is possible to assemble another conductive path such as the low-voltage conductive paths 17 into the wire harness 9 together with the high-voltage conductive path 16 without another conductive path being shielded.

Since the high-voltage conductive path 16 has the shielding member 21, it is possible to add another conductive path such as the low-voltage conductive path 17 to the wire harness 9 without changing the structure of the end portion of the high-voltage conductive path 16. Accordingly, flexibility in designing a circuit improves.

Second Embodiment

Figure 5:
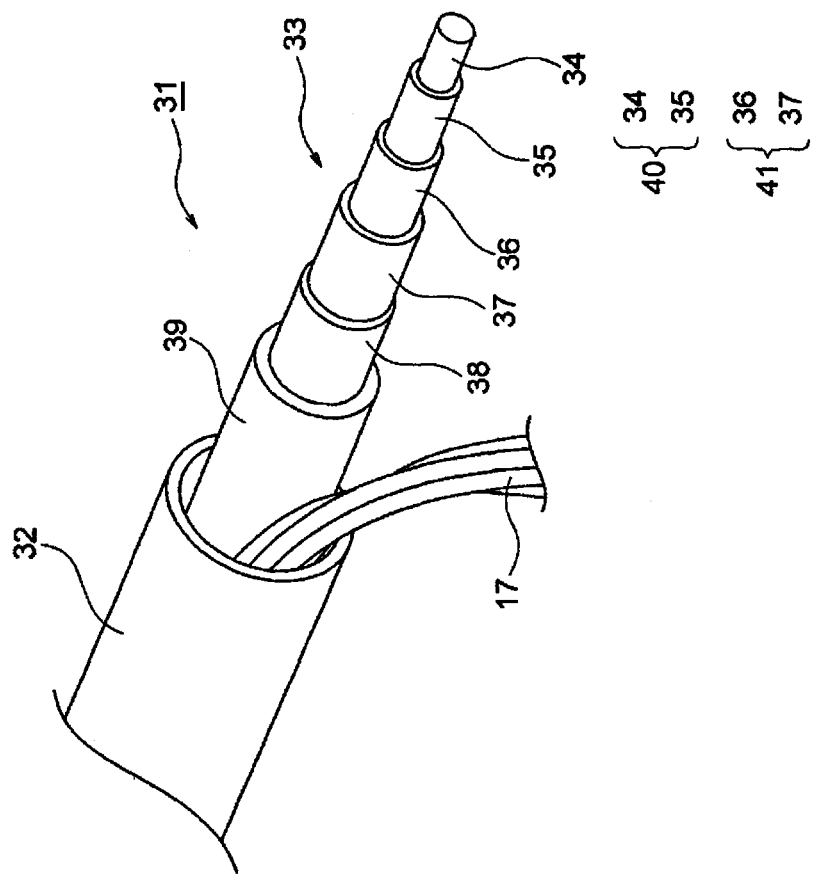
FIG. 5 is a view illustrating another example of the configuration of a wire harness.

Hereinafter, a second embodiment of a wire harness according to the present invention will be described with reference to FIG. 5. FIG. 5 is a view illustrating another example of the configuration of the wire harness.

In FIG. 5, a wire harness 31 includes a metal pipe used as an exterior member. The wire harness 31 further includes a high-voltage coaxial composite conductive path 33 (that is, a high-voltage conductive path) that is inserted into the metal pipe 32, and the low-voltage conductive paths 17 (that is, another conductive path) that are similarly inserted into the metal pipe 32, and are lined with the high-voltage coaxial composite conductive path 33. The wire harness 31 includes a high-voltage-side connecting portion (not illustrated) that is provided at an end of the high-voltage coaxial composite conductive path 33, and the low-voltage-side connecting portion 19 (refer to FIG. 2) that is provided at the ends of the low-voltage conductive paths 17.

The metal pipe 32 has a circular cross section, and except for this point, the metal pipe 32 basically has the same configuration as the metal pipe 15 (refer to FIGS. 2 and 3) in the first embodiment. The same low-voltage conductive path 17 as that in the first embodiment is adopted.

The high-voltage coaxial composite conductive path has a positive circuit and a negative circuit in a single piece of conductive path. That is, the high-voltage coaxial composite conductive path 33 has a two-system circuit. Specifically, the high-voltage coaxial composite conductive path 33 has a first conductive path 34 which is positioned at the center of the high-voltage coaxial composite conductive path 33 and has a circular cross section, and a first insulator 35 of a predetermined thickness which covers an outer circumference of the first conductive path 34. The high-voltage coaxial composite conductive path 33 has a second conductive path 36 which is provided on an outer side of the first insulator 35, and a second insulator 37 of a predetermined thickness which covers an outer circumference of the second conductive path 36. In addition, the high-voltage coaxial composite conductive path 33 has a cylindrical shielding member 38 which adheres to an outer surface of the second insulator 37, and a sheath 39 (that is, insulating member) of a predetermined thickness which covers an outer circumference of the shielding member 38.

The first conductive path 34 and the first insulator are a high-voltage circuit 40, and the second conductive path 36 and the second insulator 37 are also a high-voltage circuit 41. The shielding member 38 is made of a known braid, a known metal foil, or the like.

In the embodiment, the high-voltage coaxial composite conductive path 33 is a two-system circuit, but is not limited to that, and may be a three-system circuit, or an n-system circuit. The n-system circuit is obtained by increasing the number of circuits that are coaxially provided in a radially outward direction so as to be one configuration.

In the wire harness 31, as described above with reference to FIG. 5, since it is not necessary to use the metal pipe 32 as a shielding member similar to the first embodiment, it is possible to make the structure relevant to the shielding treatment simpler than that in the related art.

Since the high-voltage coaxial composite conductive path 33 has the shielding member 38, the high-voltage coaxial composite conductive path 33 alone can prevent noise from leaking to the outside, and the wire harness 31 from receiving outside influences without the aid of the metal pipe 32.

It is possible to assemble another conductive path such as the low-voltage conductive paths 17 into the wire harness 31 together with the high-voltage coaxial composite conductive path 33 without applying a shielding treatment to another conductive path.

It is possible to add another conductive path such as the low-voltage conductive paths 17 to the wire harness 31 without changing the structure of an end portion of the high-voltage coaxial composite conductive path 33.

In the second embodiment, the same effects as those in the first embodiment are achieved. The wire harness 31 of the second embodiment is arranged in the hybrid vehicle 1 or the like in an arranged state similar to that of the wire harness 9 in the first embodiment illustrated in FIG. 1.

Third Embodiment

Figure 6:
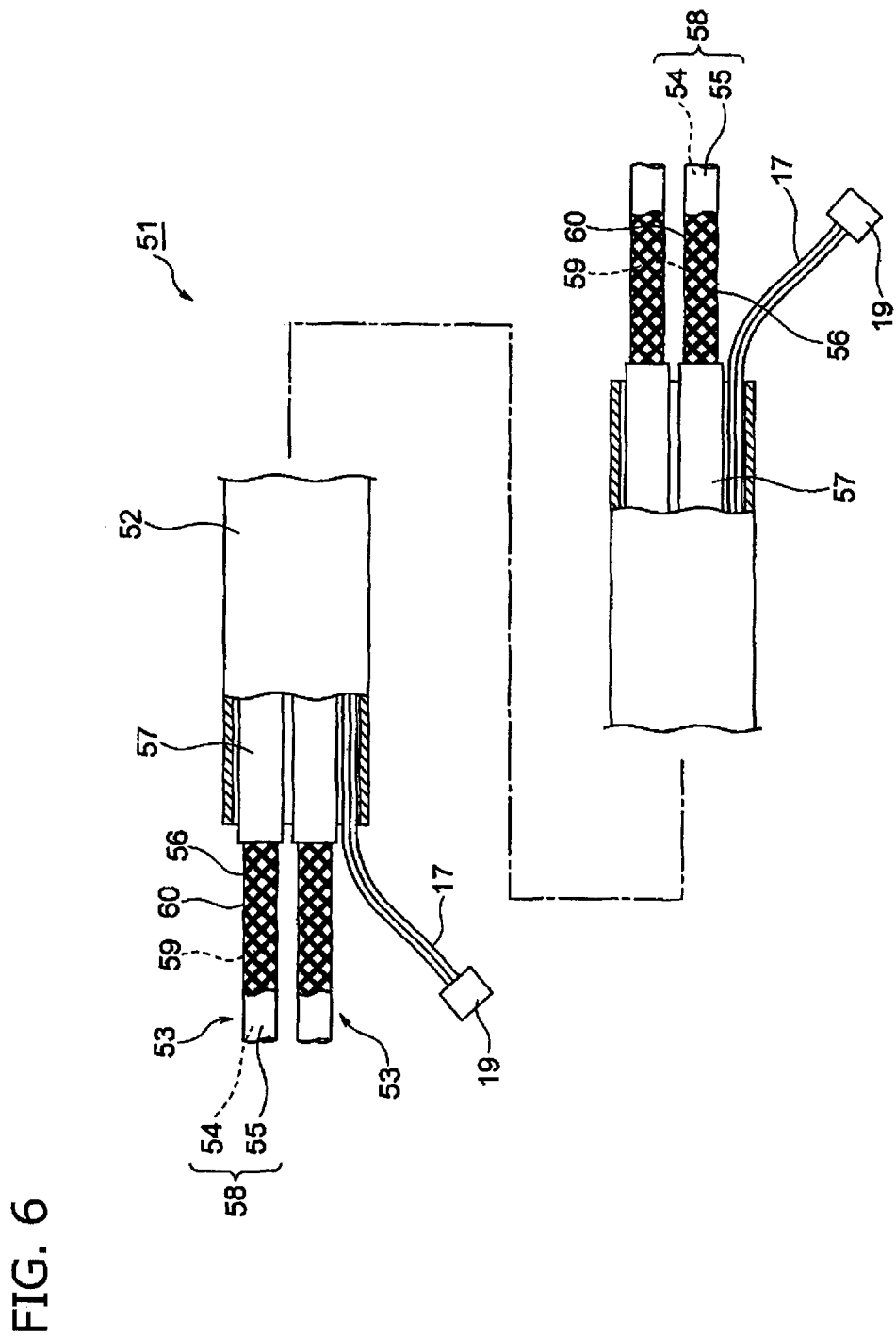
FIG. 6 is a view illustrating still another example of the configuration of a wire harness.

Hereinafter, a third embodiment of a wire harness according to the present invention will be described with reference to FIG. 6. FIG. 6 is a view illustrating still another example of the configuration of the wire harness.

In FIG. 6, a wire harness 51 includes a metal pipe used as an exterior member. The wire harness 51 includes two high-voltage shielded electric wires 53 (that is, high-voltage conductive paths) that are inserted into the metal pipe 52, and the low-voltage conductive paths 17 (that is, another conductive path) that are similarly inserted into the metal pipe 52, and are lined with the high-voltage shielded electric wires 53. The wire harness includes a high-voltage-side connecting portion (not illustrated) that is provided at the ends of the high-voltage shielded electric wires 53, and the low-voltage-side connecting portion 19 that is provided at the ends of the low-voltage conductive paths 17.

The metal pipe 52 has a circular cross section, and except for this point, the metal pipe 52 basically has the same configuration as the metal pipe 15 (refer to FIGS. 2 and 3) in the first embodiment. The metal pipe 52 may have an elliptical cross section. The same low-voltage conductive path 17 as that in the first embodiment is adopted.

The high-voltage shielded electric wires 53 are known high-voltage shielded electric wires, and includes a conductor 54; an insulator 55 that covers the conductor 54; a shielding member 56 that is provided on an outer side of the insulator 55; and a sheath 57 (that is, insulating member) that covers the shielding member 56.

The conductor 54 and the insulator 55 are a high-voltage circuit 58. The shielding member 56 is made of a known braid, a known metal foil, or the like. An end of the sheath 57 is processed in such a manner that a predetermined length of the shielding member 56 is exposed at an end portion of the wire harness 51, and the shielding member 56 has a length slightly greater than that of the metal pipe 52.

Subsequently, a method of manufacturing the wire harness 51 will be described based on the above-mentioned configuration and structure.

Each of the metal pipe 52, the two high-voltage shielded electric wires 53, and the low-voltage conductive paths 17 is pre-manufactured so as to have a predetermined length in a straight state. A step of inserting the two high-voltage shielded electric wires 53 and the low-voltage conductive paths 17 into the metal pipe 52 individually or all at once is performed. A step is performed in which the high-voltage-side connecting portion (not illustrated) is provided at the ends of the two high-voltage shielded electric wires 53, and the low-voltage-side connecting portion 19 is provided at the ends of the low-voltage conductive paths 17. As such, the manufacturing of the wire harness 51 is completed.

A circuit end portion 59 of the high-voltage circuit of the high-voltage shielded electric wires 53 leads out of the end of the metal pipe 52 while being covered with a shielding end portion 60 of the shielding member 56. The low-voltage conductive paths 17 also leads out of the end of the metal pipe 52 while being separate bodies with respect to the two high-voltage shielded electric wires 53 (that is, separate from the high-voltage conductive path 16).

In the wire harness 51, as described above with reference to FIG. 6, since it is not necessary to use the metal pipe 52 as a shielding member similar to the first embodiment, it is possible to make the structure relevant to the shielding treatment simpler than that in the related art.

Since the high-voltage shielded electric wires 53 have the shielding member 56, the high-voltage shielded electric wires 53 alone can prevent noise from leaking to the outside, and the wire harness 51 from receiving outside influences without the aid of the metal pipe 52.

It is possible to assemble another conductive path such as the low-voltage conductive paths 17 into the wire harness 51 together with the high-voltage shielded electric wires 53 without applying a shielding treatment to another conductive path.

It is possible to add another conductive path such as the low-voltage conductive paths 17 to the wire harness 51 without changing the structure of the end portions of the high-voltage shielded electric wires 53.

In the third embodiment, the same effects as those in the first embodiment are achieved. The wire harness 51 of the third embodiment is arranged in the hybrid vehicle 1 or the like in an arranged state similar to that of the wire harness 9 in the first embodiment illustrated in FIG. 1.

Fourth Embodiment

Figure 7A:
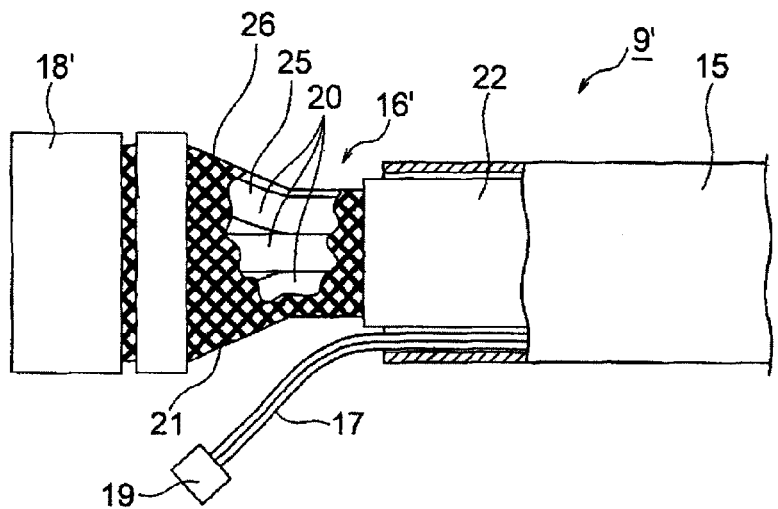
FIGS. 7A and 7B show other examples of the configuration of a wire harness.
Figure 7B:
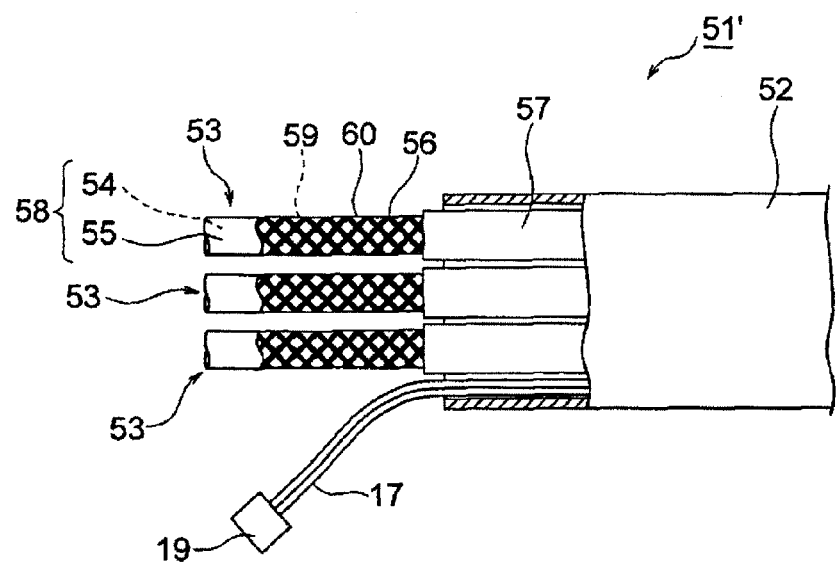

Hereinafter, a fourth embodiment will be described with reference to FIG. 7A and FIG. 7B. FIG. 7A and FIG. 7B are views illustrating other examples of a wire harness, FIG. 7A is a view illustrating a modification example of the configuration of the wire harness of FIG. 2, and FIG. 7B is a view illustrating another modification example of the configuration of the wire harness of FIG. 6.

FIG. 7A and FIG. 7B illustrate wire harnesses 9' and 51', respectively, which electrically connect the inverter unit (not illustrated) and the motor unit (not illustrated). It is possible to consider the wire harnesses 9' and 51' as motor cables. The wire harnesses 9' and 51' are effective when the inverter unit and the motor unit are mounted in a vehicle while being separate further from each other compared than illustrated in FIG. 1.

In FIG. 7A, the wire harness 9' has the metal pipe 15 used as an exterior member. The wire harness 9' has a high-voltage conductive path 16' that is inserted into the metal pipe 15, and the low-voltage conductive paths 17 (that is, the other conductive path) that similarly are inserted into the metal pipe 15, and are lined with the high-voltage conductive path 16'. The wire harness 9' includes a high-voltage-side connecting portion 18' that is provided at an end of the high-voltage conductive path 16', and the low-voltage-side connecting portion 19 that is provided at the ends of the low-voltage conductive paths 17.

The high-voltage conductive path 16' includes three high-voltage circuits 20; the shielding member 21 that covers the three high-voltage circuits 20; and the sheath (that is, insulating member) that is provided on the outer side of the shielding member 21. That is, in the configuration of the high-voltage conductive path 16', a bundle of high-voltage electric wires which is the high-voltage circuit 20 is additionally provided compared to the high-voltage conductive path 16 (refer to FIG. 2) of the first embodiment.

The high-voltage-side connecting portion 18' has a configuration and a structure which correspond to the high-voltage conductive path 16' including the three high-voltage circuits 20. Basically, the high-voltage-side connecting portion 18' is the same as the high-voltage-side connecting portion 18 (refer to FIG. 2) of the first embodiment.

In FIG. 7B, the wire harness 51' has the metal pipe 52 used as an exterior member. The wire harness 51' has three high-voltage shielded electric wires 53 (that is, high-voltage conductive paths) that are inserted into the metal pipe 52, and the low-voltage conductive paths 17 (that is, another conductive path) that similarly are inserted into the metal pipe 52, and are lined with the high-voltage shielded electric wires 53. The wire harness 51' includes a high-voltage-side connecting portion (not illustrated) that is provided at the ends of the high-voltage shielded electric wires 53, and the low-voltage-side connecting portion 19 that is provided at the ends of the low-voltage conductive paths 17.

As can be known from the above-mentioned configuration and structure, in the configuration of the wire harness 51', a bundle of high-voltage shielded electric wires 53 is additionally provided compared to that in the third embodiment.

In the fourth embodiment, the same effects as those in the first and third embodiments are achieved. That is, it is possible to achieve the simplification of work, a reduction in man-hours, and an improvement in flexibility in designing a circuit. It is possible to reduce the influence of noise on another conductive path which is assembled into a wire harness together with the high-voltage conductive path.

Hereinafter, the configuration of the wire harness (31) according to each of the embodiments is summarized.

(1) The wire harness according to each of the embodiments includes the metal pipe (32); and the high-voltage conductive path (the high-voltage coaxial composite conductive path 33), and another conductive path (the low-voltage conductive paths 17), each of which is inserted into the metal pipe and leads out of an end of the metal pipe. The another conductive path is configured as an unshielded electric wire. The high-voltage conductive path includes a first conductive path (34) that is positioned at the center of the high-voltage conductive path and has a circular cross section; a first insulator (35) of a predetermined thickness which covers an outer circumference of the first conductive path; a second conductive path (36) that is provided on an outer side of the first insulator; a second insulator (37) of a predetermined thickness which covers an outer circumference of the second conductive path; a shielding member (38) that adheres to an outer surface of the second insulator; and an insulating member (39) that is provided on an outer side of the shielding member.

(2) The another conductive path includes the low-voltage circuit (the low-voltage conductive paths 17) that has a low voltage compared to the high-voltage conductive path.

(3) The first conductive path and the first insulator are a high-voltage circuit (40), and the second conductive path and the second insulator are a high-voltage circuit (41).

In addition, naturally, various modifications can be made to the present invention insofar as the modifications do not depart from the main spirit of the present invention.

A wire harness according to the present invention is effective in the points that it is possible to achieve the simplification of work, a reduction in man-hours, and an improvement in flexibility in designing a circuit, and it is possible to reduce the influence of noise on another conductive path which is assembled into the wire harness together with a high-voltage conductive path.

What is claimed is:

1. A wire harness comprising:
a metal pipe; and
a high-voltage conductive path and another conductive path, each of which is inserted into the metal pipe and leads out of an end of the metal pipe,
wherein the another conductive path is configured as an unshielded electric wire, and
wherein the high-voltage conductive path includes a first conductive path that is positioned at the center of the high-voltage conductive path and has a circular cross section; a first insulator of a predetermined thickness which circumscribes the first conductive path; a second conductive path that circumscribes the first insulator; a second insulator of a predetermined thickness which circumscribes the second conductive path; a shielding member that adheres to and circumscribes the second insulator; and an insulating member that circumscribes the shielding member.

2. The wire harness according to claim 1,
wherein the another conductive path includes a low-voltage circuit that has a low voltage compared to the high-voltage conductive path.

3. The wire harness according to claim 1,
wherein the first conductive path and the first insulator are a high-voltage circuit, and the second conductive path and the second insulator are a high-voltage circuit.

* * * * *